United States Patent [19]

Fouassier

[11] Patent Number: 4,678,245
[45] Date of Patent: Jul. 7, 1987

[54] MODULAR DEVICE FOR STORING COMPACT DISCS OR THE LIKE

[76] Inventor: Jean-Pierre Fouassier, 10, rue de Strasbourg, 94230 Cachan, France

[21] Appl. No.: 850,615

[22] Filed: Apr. 11, 1986

Related U.S. Application Data

[63] Continuation-in-part of Ser. No. 740,048, May 22, 1985, abandoned.

[51] Int. Cl.⁴ .................................. A47B 81/06
[52] U.S. Cl. ........................... 312/15; 206/387; 312/257 A; 312/319
[58] Field of Search .............. 211/40, 175; 206/387, 206/248; 312/10, 12, 15, 319, 257 R, 252 A; 220/22.1, 22.2, 22.3, 72, 22

[56] References Cited

U.S. PATENT DOCUMENTS

| | | | |
|---|---|---|---|
| 887,631 | 5/1908 | Hawthorne | 312/10 |
| 2,868,606 | 1/1959 | Stierna | 312/10 X |
| 4,446,966 | 5/1984 | Moloney | 220/22 |
| 4,453,785 | 6/1984 | Smith | 312/10 |
| 4,548,320 | 10/1965 | Box | 220/72 |

FOREIGN PATENT DOCUMENTS

| | | | |
|---|---|---|---|
| 676777 | 5/1939 | Fed. Rep. of Germany | 220/22.3 |
| 197803 | 3/1978 | Fed. Rep. of Germany | 220/22.3 |
| 2021072 | 3/1978 | United Kingdom | 206/387 |

Primary Examiner—Joseph Falk
Attorney, Agent, or Firm—Bacon & Thomas

[57] ABSTRACT

The invention relates to a device for storing compact discs, cassettes and the like comprising removable vertical inner walls provided with horizontal protrusions defining storing compartments, said protrusions can be removable to allow storage of discs, cassettes of different width. The device is easy to stack and to manufacture.

8 Claims, 5 Drawing Figures

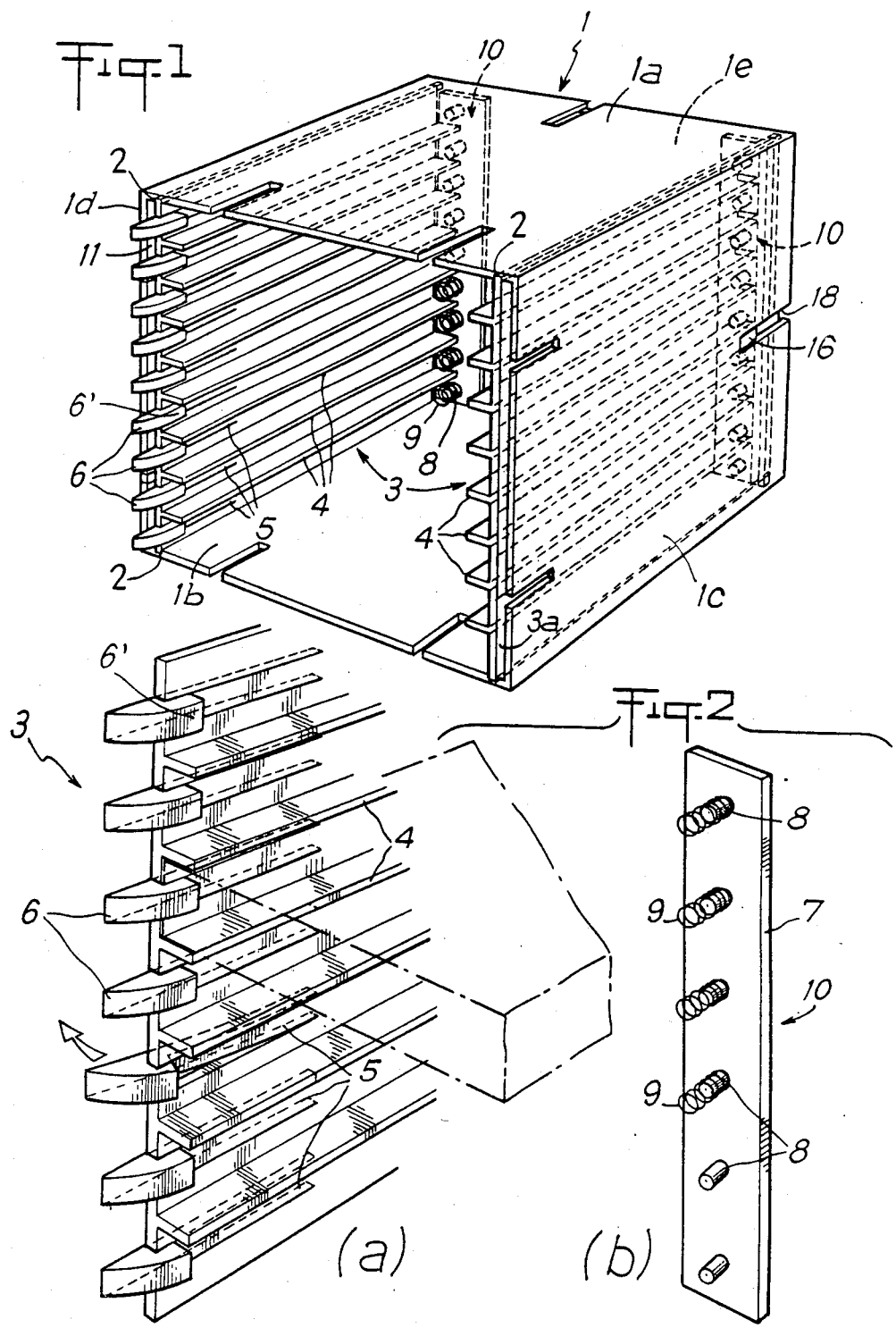

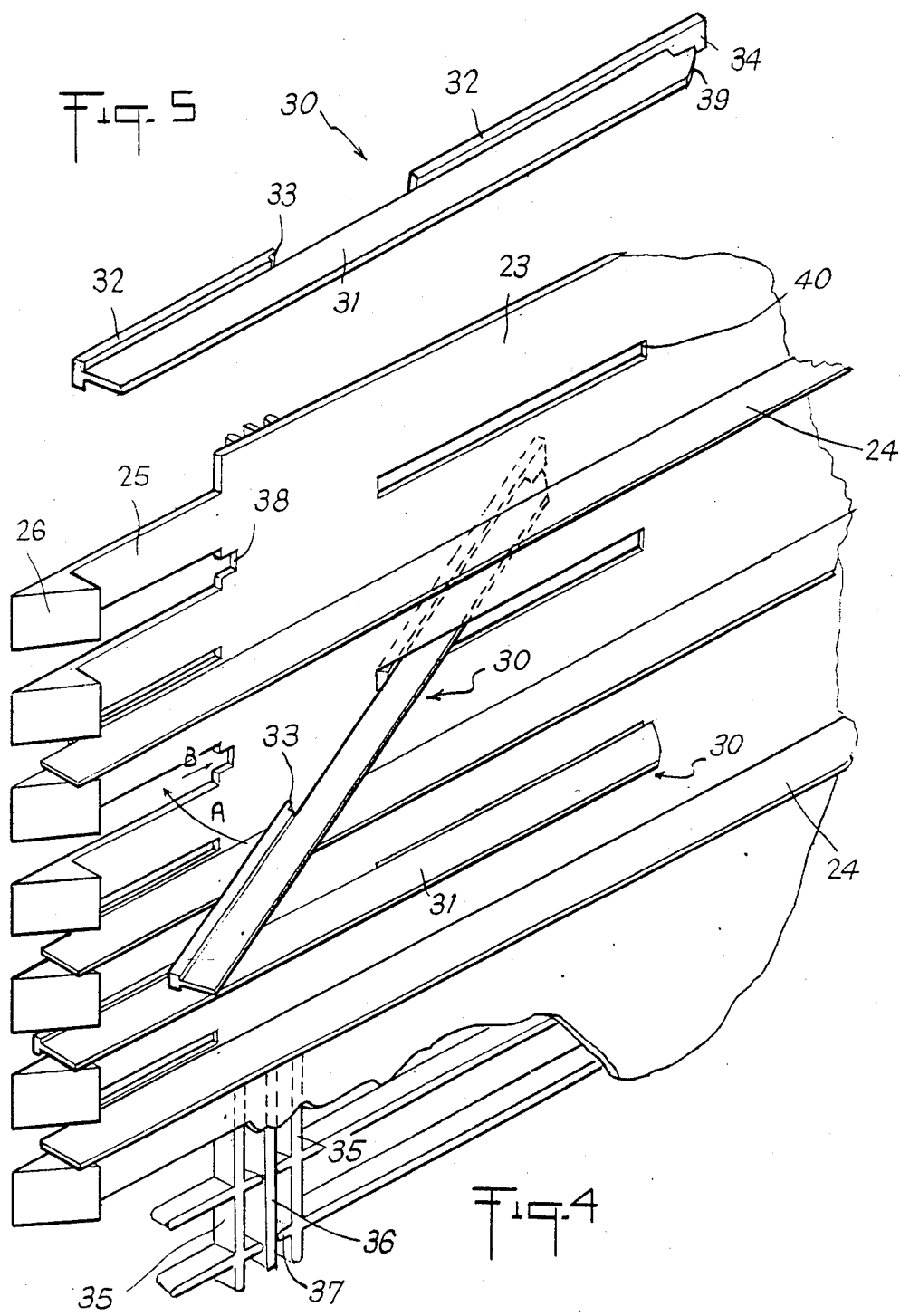

MODULAR DEVICE FOR STORING COMPACT DISCS OR THE LIKE

This application is a continuation-in-part of pending application Ser. No. 740,048 filed on May 22, 1985 now abandoned corresponding to PCT application No. PCT/FR 84/00215 filed on Sept. 29, 1984, and is related to pending application Ser. No. 737,215, now abandoned filed on May 23, 1985.

The invention relates to a modular storing device for storing a plurality of objects which may be "compact" discs cartridges (namely for laser reading) and audio and video tape cassettes, and the like.

A certain number of devices of this type are already known.

For instance, Smith U.S. Pat. No. 4,453,785 discloses a modular cabinet unit constructed for holding in uniform position, a plurality of objects notably video game cartridges and audio and video tape cassettes of different sizes and shapes To this effect said unit has an open side and an interior construction. The inside of the cabinet side-walls are provided with ribs for holding said objects in uniform predetermined relationship. The top and bottom cabinet walls have also inwardly extending ribs to form guideways for insertion of divider members. Said divider members have relatively short extending ribs on opposite sides thereof which are aligned with said ribs of the side-walls. A face plate is required to lock the divider members in the cabinet (see the claim and FIG. 15 to 18 notably) which is very costly to manufacture.

This structure is requiring the manufacture of the specific cabinet unit with a number of specific ribs, the ribs of the top and bottom walls being of different patterns with respect to those of the side-walls. This implies a high manufacturing cost, further the number of distinct elements is rather high, including the need of a front plate for locking the divider members.

Since the cabinet unit is provided with integral inner ribs, this implies a predetermined relationship of the compartments for storing the objects. This is clearly outlined in the Smith description and in the claim (1. 15–16).

For a different relationship it will be necessary to manufacture a different cabinet structure. This is all the more true that the ribs of the divider members are aligned with those of the cabinet walls (see the claims, 1. 26–29).

The divider members are only used to sub-divide the space defined in the interior construction.

Accordingly, the user is linked to the predetermined pattern of the ribs of the cabinet walls and this is a great drawback.

G.B.—2021072 concerns a storage device for tape cassettes and for cartridges constituted by two interconnected half sections 12 and 13 held together in abutting relationship by the sliding engagement of each pair of abutting flanges 12a, 13a within corresponding upper and lower slots 15 formed in central assembly 16. This central assembly comprises two spaced walls 17 and 18 shaped to provide the upper and lower slots 15.

This engagement holds the two half sections 12 and 13 of the housing firmly together while positioning the central assembly 16 in the housing.

The walls 17, 18 of the device comprise guide-ways 19 and the opposite walls of the half sections are provided with corresponding guide-ways 19. Front and rear members 20, 21 are locking the walls 17, 18 in position.

Accordingly, the structure of the storage device is complicated, involving high costs of manufacture. Further the ways 19 of the walls 17, 18 are integrated with said walls so that there is a predetermined relationship between the compartments. This requires a specific storage device for each compartment relationship. this storage device is not modulatable, while the cassettes are locked by retaining means 25 and the walls 17, 18 are locked by front and rear members 20, 21.

A main object of the invention is to provide a storage device wherein the design or pattern of the ribs or guide ways defining the compartments is fully independent from the storage device which latter can be made of any material and at the limit which can be defined by a hole carried out in the body of said material.

Another object of the invention is to provide a storage device easily modulatable by stacking and linking adjacent devices unlimited number.

A further object of the invention is to provide a storage device with a very low number of distinct pieces easy to be assembled together, by the user, achieving a low manufacturing cost.

Again an object of the invention is to provide a storage device with excellent locking in position of the stored objects permitting use in a car without the risk of unpleasant noises being created inside the vehicle and in a perfect storage safety.

Again a further object of the invention is to provide a storage device allowing storage of object of different thicknesses, by provision of adaptable ribs or guideways relationship.

All these objects and purposes of the invention are achieved with the present invention with the correlative position unexpected technical advantages which become apparent for one skilled in the art.

Thus, according to a preferred embodiment the invention provides a modular storage device for storing a plurality of objects which may be compact disc cartridges and audio and video tape cassettes, said device comprising a frame having a generally horizontal bottom wall, two generally vertical side walls, and a generally vertical rear wall, said side-walls and rear wall extending from said bottom wall up to a generally horizontal top wall, said frame having thereby a front open side for permitting insertion of said objects therein, said top and bottom walls having two pairs of grooves inwardly extending substantially parallel to said side-walls and near to, but at a predetermined distance from, said side-walls, said grooves being designed to serve as sliding and guiding means for spaced apart removable first and second inner walls, said first removable inner wall and said second removable inner wall having inwardly opposite faces and outwardly directed faces, said inwardly opposite faces being provided with generally horizonal protrusions defining between them storing compartments for said objects, at least one of said first removable inner walls and of said second removable inner wall comprising on the end thereof aimed to be in the vicinity of said front open end and between said protrusions, slits defining an elastic tongue ending into an integral bevelled part extending inwardly to form a retaining hook elastically pivotable outwardly in the space left between said removable inner walls and said side-walls, said first and second removable inner walls being locked in position by the provision of first locking means on their outwardly directed faces cooperating with second locking means in the body of said side-walls. Preferably, said first locking means is constituted by a outwardly protruding hook integral with said outwardly directed face and said second locking means is constituted by a cooperating recess wherein said hook is resiliently locked. Said recess is advantageously defined by a through orifice in said side-wall near the rear part therof.

According to a specific feature of the invention, storing device, each of said bottom wall, of said side walls, of said top wall, comprises at least one notch dimensioned so as to receive a key member of generally parallelepipedal shape and of H-shaped cross-section so that said two or more juxtaposed storing devices are safety linkable through insertion of said key member into two aligned overlying notches of said two devices.

Preferably, the storing device comprising three notches per wall located symmetrically with respect to the symmetrical plane of said device going through same wall. Advantageously one of said notch is constituting said second locking means of the inner wall.

According to another specific feature, said rear wall is provided with at least one removable base plate comprising inward discrete projections projecting into said storing compartments and supporting resilient means acting as means for ejecting said objects from said compartments.

According to the best mode at least one of said horizontal protrusions is removable from said inner wall, the remaining protrusions being integral with said inner wall. Preferably, said removable protrusions and said integral protrusions are located alternately on said inner wall.

According to another feature of the invention, it has been realized, surprizingly, that it was particularly advantageous if the spring assembly were disposed asymmetrically so as to push the cassettes laterally towards the inner wall bearing the retaining hooks.

In that case, the inner wall bearing the hooks is advantageously provided with reinforcing ribs, at right angles to the hooks, on its face turned towards the sidewall. If, as is normally the case the inner wall is made of plastics materials, a metallic reinforcing bar may also be provided.

Other characteristics and advantages of the invention will be become apparent on reading the following description with reference to the accompanying drawings, in which:

FIG. 1 is a perspective view of the complete modular storage device according to the invention;

FIG. 2 is a perspective view of the removable first and second inner walls 3 and 10 according to the invention (FIGS. 2 (*a*) and 2 (*b*)) out of the frame;

FIG. 4 is a partial perspective view of a removable inner wall according to the invention with parts torn away.

FIG. 5 is a perspective view showing a removable protrusion in detail.

Figure 3:
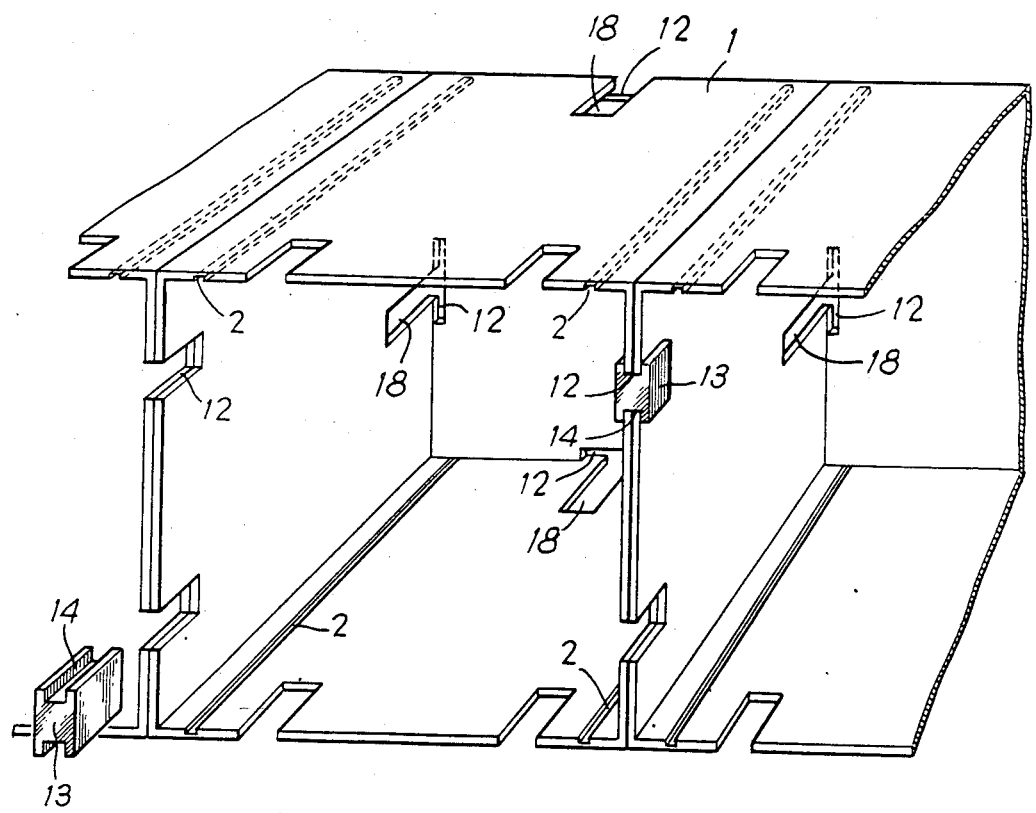
FIG. 3 shows a preferred embodiment of creation of the modules.

The storage device according to the invention is composed of an open frame 1 of which the top and bottom walls (1*a*, 1*b*) are provided on the inside with four grooves 2 inwardly extending substantially parallel to the side-walls (1*c*, 1*d*) and near to, but at a predetermined distance from, said side-walls 1*c*, 1*d*. Said grooves are designed to serve as sliding and guiding means for first and second removable inner walls 3. Said inner walls 3 are locked in position by the provision of first locking means 16 on their outwardly directed faces 3*a* cooperating with second locking means in the body of said side walls. Preferably said first locking means 16 is constituted by a outwardly protruding hook integral with said outwardly directed face 3*a* and said second locking means 18 is constituted by a cooperating recess as shown wherein said hook is resiliently locked. Said recess is advantageously defined by a through orifice by a through orifice in said side-wall 1*c*, 1*d* near the rear part thereof.

It is essential, and this is an important feature of the invention, to leave a space 11 between each inner wall and the opposite face of the side wall 1*c*, 1*d*, said space being such that it permits a normal pivoting movement of the elastic tongue 5 defined by slitting and ending into a integral bevelled part 6 extending inwardly (6') to form a retaining hook elastically pivotable outwardly. This space 11 serve also for locking the inner walls 3 with the aid of elastically pivotable locking hook 16.

It is preferred for each retaining hook (6) to have said bevelled part (6') situated in offset manner with respect to the front end of the horizontal protrusions (4), in order to improve the guiding of the cassette, disc, etc . . . when these are inserted into the case, thus avoiding that the return force exerted by the tongue (5), and bevelled part (6) affects the accuracy necessary for the positioning.

Each removable inner wall 3 comprises generally horizontal protrusions 4 spaced apart one from the other to form separate compartments adapted to the dimensions of the disc, cassettes, etc . . . .

Each inner wall 3 comprises said protrusions in facing relation but it is not necessary for each inner wall 3 to comprise the elastic means 5,6. This could even create a problem of duplicating handling.

The device according to the invention further comprises here two removable base plates 10 designed to be fixed (by clipping in, glueing, etc.) on the rear wall 1*e* of the frame 1 as illustrated in FIG. 1. Preferably only one base plate is present.

Each base plate 10 is formed of a base plate 7 comprising inward discrete projections 8 projecting into said compartments and supporting resilient means 9 such as springs merely threaded over said projections and secured by adhesive means or the like. Said resilient means are acting as ejecting means for ejecting said objects from said compartments.

The disc is then slid into one of the compartments. It moves itself the elastic tongue 5 due to the bevelled shape of its part 6, then, when it is in position, the springs are compressed, whereas the hook 6 clips in. The disc is then positioned without any possible play. The disc is ejected by moving part 6 backwards.

It will be noted that, due to lateral space 11, the movement of the part 5, 6 takes place inside the frame 1 or device 1.

It is therefore possible to juxtapose several devices without problems. Thus the invention affords the possibility of producing modulatable elements.

This this effect, a system for assembling the modules is shown in accompanying FIG. 3.

Each wall, which is abutting the close open end of each device to be assembled, comprises notches 12 (preferably two, in the body of each wall dimensioned so as to receive a key member 13 of H-shaped cross-section having lateral grooves 14. Each key member 13 will itself be so dimensioned as to be insertable in the double notch formed by the accurate juxtaposing of two walls (1) and the width of the grooves (14) made in the key be twice the thickness of the wall (1). It is thus possible to assemble in a particularly practical way, in all directions, as many devices as may be required. The key members may be produced from a material which, with the material making up the device, has a coefficient of friction permitting a ready and reliable assembly of the device.

All pieces, 3, 7, 8 may be produced without problem by molding of a plastic material.

· The frame of the storage device may be of any shape, except that four grooves 2 or like system has to be provided. Said case may therefore for the first time be made of wood, have a particular design, etc.

One of the great advantages of the invention is therefore to allow separate production of the different parts, and their insertion inside a frame adapted to the different requirements of users.

With reference to FIGS. 4 and 5 the elements substantially similar to the elements described in the mentioned preceding figures bear the same reference numbers increased by twenty. The original elements of the present embodiment are numbered from 30.

Thus, each removable inner wall 23 is provided with elastic tongues 25 terminating in hooks 26 for retaining cassettes. The inner wall 23 comprises normally horizontal protrusions 24 adapted to determine compartments for storing the cassettes.

If as is preferably the case, the wall 23 is made of plastics material, the protrusions are generally provided to be manufactured at the same time as the plate, and integral therewith.

However, according to the best embodiment shown some of the horizontal protrusions are foreseen removable from said inner wall 23 which enables the different thicknesses of cassettes used to be taken into account.

Accordingly, at least some of the integral protrusions 24 are replaced by removable protrusions 30.

These removable protrusions 30 comprise a guiding part 31 whose role and dimensions are comparable to those of the integral projections 24, and a fixing part 32 constituting a sole which is possibly thicker (hence a T section visible in the figures).

The removable protrusions 30 are fixed to inner wall 23 on the one hand by a first catch 33 which forms an open notch inserted (by longitudinal displacement) on an edge 38 of the inner wall 23, and on the other hand, by a second catch 34 (longer than the first) abutting on the edge of a slot 40 made in the inner wall 23. Positioning is effected as indicated in FIG. 1 by partial introduction of removable protrusions 30 in slot 40, then pivoting in the direction of arrow A and translation for blocking in the direction of arrow B.

Removable protrusion 30 is manufactured from an elastorigid material allowing slight deformation for unclipping: a chamfer 39 on the front part thereof renders this unclipping easier.

Sole 32 may be dimensioned so as to come substantially in abutment on the wall (not shown) of the device in which that inner wall 23 not bearing a tongue is inserted.

The removable protrusions 30 of the invention and the integral protrusions 24 may be disposed alternately, this allowing cassettes of single format or of double format to be stored, as desired, by maintaining or removing said removable pieces.

According to another original feature of the invention, the storage device has been modified in the following manner: instead (at the rear wall of the device) of having two bases supporting the springs for ejecting the cassettes, i.e. two springs per single compartment exerting a symmetrical pressure on each casette, it is provided to exert an asymmetrical pressure which pushes the cassette, orienting it towards the hooks 26, assumed to equip only one of the two lateral inner walls of the case. To that end, there is for example only one row of springs on the rear wall of the device, this row being offset, with respect to a median line of the rear wall parallel to the plates, on the side opposite the inner wall 23 bearing the hooks 26. The row of springs is advantageously disposed at two-thirds of the width of the rear wall.

Consequently, the cassettes are pushed more reliably against the hooks and hooking thereof is ensured even despite the relatively wide manufacturing tolerances of the cassettes (which may reach some 7/10° of mm): in fact, a massive arrival on the market of cassettes of various origins has been observed, the quality and standardization of which leave much to be desired.

This assymmetrical pressure of the cassettes might, depending on the nature of the material constituting the inner wall 23 and the device, bring about a buckling of the inner wall 23, and even of the side walls of the device.

This is why elements for structurally reinforcing the inner wall 23 in the direction perpendicular to the protrusions 24 and 30 have been provided according to the invention. These elements comprise for example ribs 35 integral with the inner wall 23, and advantageously a steel bar 36 wedged between integral projecting ribs 37.

It can be observed from the above that the storage of the cassettes is very simple and that the invention storage device is reliable with a great versatility. This constitutes an unexpected and unobvious improvement over the prior art. Further the presence of space 11 allows the insertion of the linking keys which would not be possible without it.

What is claimed is:

1. A modular device for storing a plurality of objects such as compact disc cartridges, audio tape cassettes, video tape cassettes or the like comprising:
   (a) a frame comprising:
      (i) a generally horizontal bottom wall;
      (ii) two generally vertical outer side walls and a generally vertical rear wall extending upwardly from the bottom wall; and,
      (iii) a generally horizontal top wall attached to the outer side and rear walls to define a frame having an open front;
   (b) first and second inner side walls each having a plurality of generally horizontal fixed protrusions extending from one side thereof, each inner side wall having an edge portion and defining a slot having an end;
   (c) guide means defined by the bottom and top walls for removably locating an inner side wall adjacent to an outer side wall such that the inner side walls extend generally parallel to the adjacent outer side wall;
   (d) releasable locking means interposed between an inner side wall and an adjacent outer side wall to positively latch the inner side wall to the adjacent outer side wall;

(e) a resilient tongue formed on at least one of the inner side walls so as to be located near the open front of the frame, the tongue having a distal end;

(f) a retaining hook member formed on the distal end of the resilient tongue; and, (g) at least one removable protrusion removably attached to each inner side wall, the removable protrusion comprising:

(i) a generally planar, horizontally extending portion;

(ii) a fixing portion attached to the planar portion;

(iii) a first catch means defined by the fixing portion and the planar portion adapted to removably engage the edge portion of the inner side wall; and (iv) a second catch means defined by the fixing portion and the planar portion adapted to removably engage the end of the slot defined by the inner wall.

2. The modular storage device according to claim 1 further comprising:

(a) a base plate attached to the rear wall of the frame; and, (b) spring biasing means attached to the base plate so as to extend toward the open front of the frame.

3. The modular storage device according to claim 1 wherein the releasable locking means to releasably latch the inner side wall to the adjacent outer side wall comprises:

(a) a resilient locking hook member attached to the inner side wall and extending toward the adjacent outer side wall; and, (b) a locking notch defined by the outer side wall and located so as to be engaged by the locking hook member.

4. The modular storage device according to claim 1 wherein the bottom wall, the outer side walls and the top wall each define at least one notch and further comprising a key member adapted to engage corresponding notches in a pair of storage devices so as to fasten the storage devices together.

5. The modular storage device according to claim 4 wherein the key member has a generally "H" shaped cross-section defining oppositely opening grooves.

6. The modular storage device according to claim 1 wherein the guide means comprise:

(a) a first pair of guide grooves defined by the bottom wall spaced from and extending generally parallel to the outer side walls; and, (b) a second pair of guide grooves defined by the top wall spaced from and extending generally parallel to the outer side walls.

7. The modular storage device according to claim 6 wherein the first and second guide grooves are dimensioned so as to slidably receive the first and second inner side walls, respectively.

8. The modular storage device according to claim 1 further comprising reinforcing ribs attached to the inner side walls and extending generally perpendicular to the generally horizontal protrusions.

* * * * *